(12) United States Patent
Bessettes et al.

(10) Patent No.: US 7,748,688 B2
(45) Date of Patent: Jul. 6, 2010

(54) FIXTURING STRUCTURE FOR A FLUID EXCHANGE COLUMN

(75) Inventors: Rémi Bessettes, Tresses (FR); Jean-Pierre Maumus, St Medard en Jalles (FR)

(73) Assignee: SNECMA Propulsion Solide, Le Haillan (FR)

( * ) Notice: Subject to any disclaimer, the term of this patent is extended or adjusted under 35 U.S.C. 154(b) by 917 days.

(21) Appl. No.: 11/477,827

(22) Filed: Jun. 29, 2006

(65) Prior Publication Data

US 2007/0096347 A1    May 3, 2007

(30) Foreign Application Priority Data

Oct. 28, 2005    (FR) .................................. 05 11051

(51) Int. Cl.
*B01F 3/04*    (2006.01)
(52) U.S. Cl. .................... 261/94; 261/95; 261/DIG. 72
(58) Field of Classification Search .................. 261/94, 261/95, DIG. 72; 202/158
See application file for complete search history.

(56) References Cited

U.S. PATENT DOCUMENTS

| | | | | |
|---|---|---|---|---|
| 3,949,126 A | * | 4/1976 | Crawford, Jr. .............. | 428/113 |
| 4,072,736 A | * | 2/1978 | Fattinger ..................... | 261/97 |
| 4,168,337 A | * | 9/1979 | Maistre ....................... | 428/113 |
| 4,219,597 A | | 8/1980 | Maistre ....................... | 428/105 |
| 4,252,588 A | * | 2/1981 | Kratsch et al. .............. | 156/73.6 |
| 4,268,560 A | * | 5/1981 | Maistre ....................... | 52/648.1 |
| 4,411,942 A | | 10/1983 | Nickel et al. ................. | 428/137 |
| 4,744,928 A | | 5/1988 | Meier .......................... | 261/95 |
| RE34,255 E | * | 5/1993 | Friedrich .................... | 366/337 |
| 6,595,679 B2 | * | 7/2003 | Schuchardt ................. | 366/147 |
| 7,303,668 B2 | * | 12/2007 | Liao ........................... | 210/150 |
| 2003/0001293 A1 | * | 1/2003 | Nagaoka et al. ............. | 261/94 |

FOREIGN PATENT DOCUMENTS

| | | |
|---|---|---|
| EP | 0 639 402 | 2/1995 |
| EP | 0 899 011 | 3/1999 |
| FR | 2 276 916 | 1/1976 |
| FR | 2 424 888 | 11/1979 |
| FR | 2 444 012 | 7/1980 |
| FR | 2 494 832 | 5/1982 |
| GB | 1 509 208 | 5/1978 |
| GB | 2 090 385 | 7/1982 |

* cited by examiner

*Primary Examiner*—Scott Bushey
(74) *Attorney, Agent, or Firm*—Weingarten, Schurgin, Gagnebin & Lebovici LLP

(57) ABSTRACT

The invention relates to a packing structure (1) for a fluid exchange column, the packing structure defining an exchange surface for at least one down-flowing liquid phase that is to be put into intimate contact with at least one up-flowing gas phase, the structure including a volume formed by a plurality of rows of bundles of tubes (10), each bundle having four tubes (10*a*-10*d*) respectively oriented along four directions (D10*a*-D10*d*) forming an angle relative to the axis of the structure, the plurality of tubes forming a plurality of passages opening out to the outside surface of the structure (1).

16 Claims, 10 Drawing Sheets

# FIXTURING STRUCTURE FOR A FLUID EXCHANGE COLUMN

This application claims priority to French application No. 05 11051 filed Oct. 28, 2005.

BACKGROUND OF THE INVENTION

The present invention relates to the general field of fluid exchange equipment. This well-known type of equipment generally comprises a cylindrical enclosure or exchange column within which exchanges are implemented between at least two fluids. As a general rule the exchange consists in implementing an exchange (of matter, heat, . . . ) between a down-flowing liquid phase and an up-flowing gas phase. Exchange columns are used in particular for performing operations such as distillation (distillation column), condensation, rectification, absorption, desorption, separation, extraction, precipitation, chemical reaction, etc.

In order to encourage exchange between the fluids, it is known to introduce packing elements into the column so as to increase the contact area between the fluids. Such elements may be constituted, for example, by plates, by rings (e.g. Raschig rings), by spirals, etc.

It is also known to make use of stacks of grids or racks, fiber padding, etc.

Nevertheless, there is a limit on the extent to which exchange area can be increased in a column: flow rate. By increasing the exchange area inside the column, the efficiency of the treatment is increased by encouraging intimate contact between the fluids. Nevertheless, if this increase in exchange area is obtained to the detriment of the flow rate through the column, e.g. by using a packing that is too dense, then the efficiency of the treatment is penalized by reducing the rate at which the fluids flow (are renewed), thereby canceling out in part the effects obtained by increasing the exchange area.

OBJECT AND SUMMARY OF THE INVENTION

The present invention seeks to propose a novel design of packing for a fluid exchange column that enables exchange area to be optimized between the fluids without penalizing flow rate along the column.

In accordance with the invention, this object is achieved by the fact that the packing structure comprises a volume formed by a plurality of rows of bundles of tubes, each bundle comprising four tubes respectively oriented along four directions forming an angle relative to the axis of the structure, the plurality of tubes forming a plurality of passages opening out to the outside surface of the structure.

Thus, the packing structure of the invention provides a large exchange area while preserving flow rate. Exchange between the fluids flowing through the structure is achieved both inside and outside the tubes which themselves form a multitude of flow channels encouraging fluid flow through the column.

The volume of the structure may further include a plurality of pores between the tubes so as to define additional passages for the liquid phase and the gas phase through the structure.

The tubes may be of carbon-carbon or ceramic composite material, of metal, of thermoplastic material, or of thermosetting material.

The exchange area may also be increased with tubes presenting macropores providing passages between the insides and the outsides of the tubes.

The surfaces of the tubes may also carry a chemical catalyst.

The present invention also provides a method of fabricating a packing structure for a fluid exchange column, the method being characterized in that it comprises:
a) forming the tubes;
b) constructing an ordered assembly of said tubes in a plurality of rows of bundles of tubes, each bundle comprising four tubes respectively oriented along four directions;
c) bonding the tubes together via their contacting portions; and
d) machining the ordered assembly to form a packing structure matching the shape and the inside dimensions of the column in which it is to be inserted.

In an aspect of the invention, in step a), the tubes are made of carbon or ceramic composite material. In which case, the method may further a step of carbonizing the tubes by heat treatment followed by a step of chemical vapor deposition (CVD) of carbon.

According to another aspect of the invention, the tubes are made of a carbon composite material and the method further includes a step of oxidizing the tubes so as to make their surfaces hydrophilic. At the end of this step, the surfaces of the tubes can be covered in a catalyst by impregnating the tubes with a solution containing the catalyst and by drying the solution by evaporation so as to leave only the catalyst on the surfaces of the tubes.

BRIEF DESCRIPTION OF THE DRAWINGS

Other characteristics and advantages of the invention appear from the following description of particular embodiments of the invention, given as non-limiting examples, and with reference to the accompanying drawings, in which.

DETAILED DESCRIPTION OF AN EMBODIMENT

The description begins with a method of fabricating a packing structure in accordance with an embodiment of the invention descried with reference to FIGS. 1 to 4.

The structure is made from an assembly of tubes. The first step (step S1) thus consists in forming the tubes. The tubes may be made of composite material such as carbon or ceramic (SiC), or indeed of a material that is metallic, thermoplastic, or thermosetting. The tubes preferably present a wall thickness that is as thin as possible.

For tubes made of composite material (e.g. carbon tubes or SiC tubes), the tubes may be formed for example from braids, from windings of filaments, from wound strips, or from tubes optionally made by pultrusion and that are maintained in shape on a support rod and consolidated by a liquid technique, i.e. by impregnating the braid with a resin that can be cokefied and infiltrated, such as a phenolic resin, and by cross-linking the resin by heat treatment.

The tubes are preferably made of carbon/carbon composite material which is known for its ability to withstand acids and corrosion.

Figure 1:
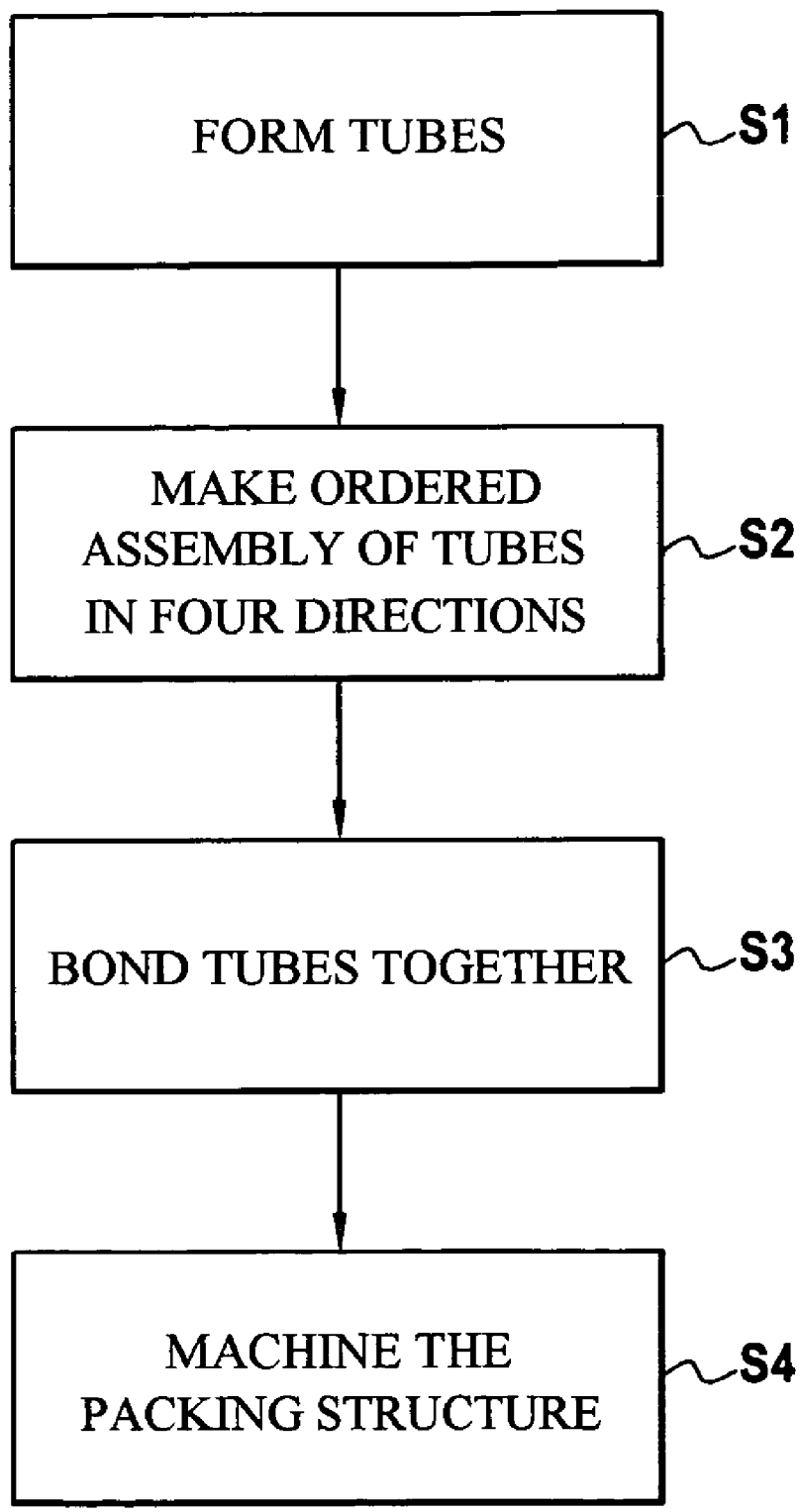
FIG. 1 is a flow chart showing the successive steps in an implementation of the method of manufacturing a packing structure in accordance with the invention.
Figure 2A:
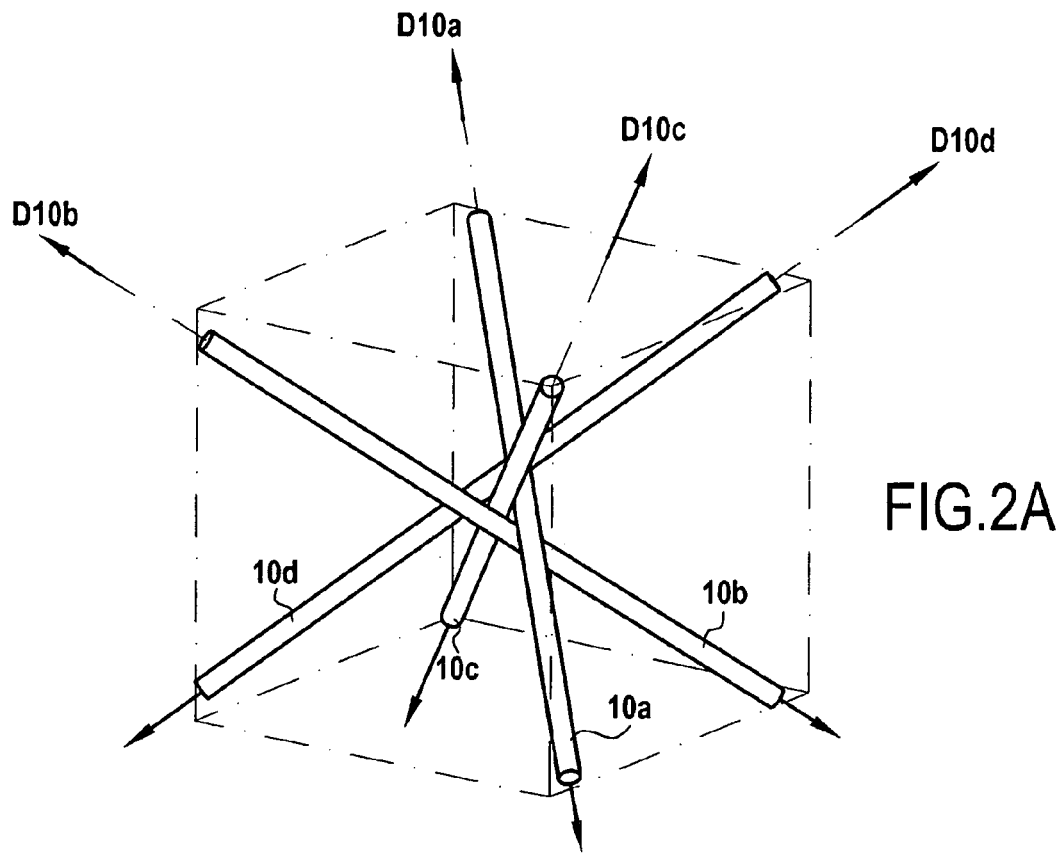
FIGS. 2A to 2D are perspective views showing the construction of an ordered assembly of tubes in accordance with the invention.

Thereafter, an ordered assembly is constructed with the tubes formed during the preceding step. The tubes are disposed along four distinct directions (step S2). FIG. 2A shows a bundle of four tubes 10a to 10d, each extending along one of the four assembly directions D10a to D10d. The four directions D10a to D10d along which the tubes are assembled correspond in this example respectively to the four diagonals of a cube (or the four heights/edges of a regular tetrahedron), except that the tubes do not intersect where the diagonals intersect in the center of the cube, but cross over one another in the vicinity of this point.

Figure 2B:
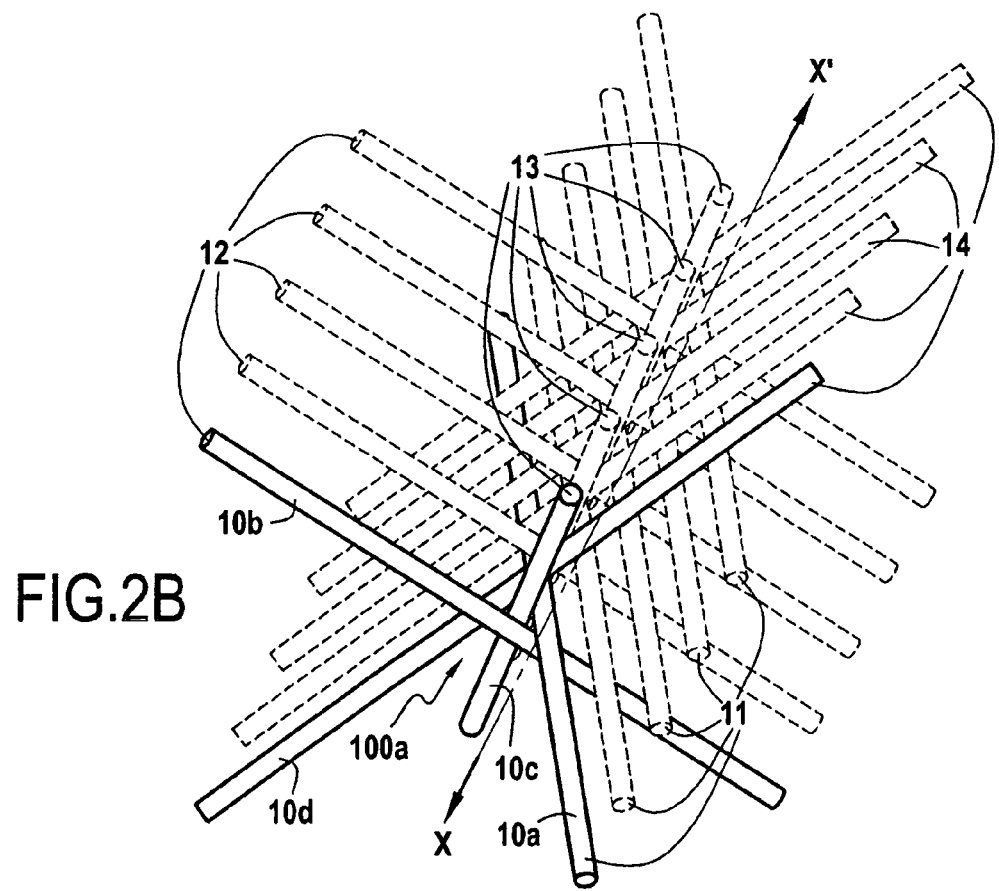

The construction of the ordered assembly can begin for example by repeating the disposition of FIG. 2A, i.e. by placing a new bundle of tubes 10a to 10d organized in the same order as the preceding bundle on the crossover point of the four tubes of that bundle along a construction axis XX', and so on. As shown in FIG. 2B, this produces the beginning of an ordered assembly formed by a first row 100a of tube bundles 10a to 10d in alignment along the axis XX'. This forms a crossed configuration of four sheets of tubes 11 to 14 each extending in a plane oriented along one of the four assembly directions of tubes in a bundle. The tubes in each sheet are spaced apart from one another by a distance that allows the tubes of the other sheets to pass (cross over).

Figure 2C:
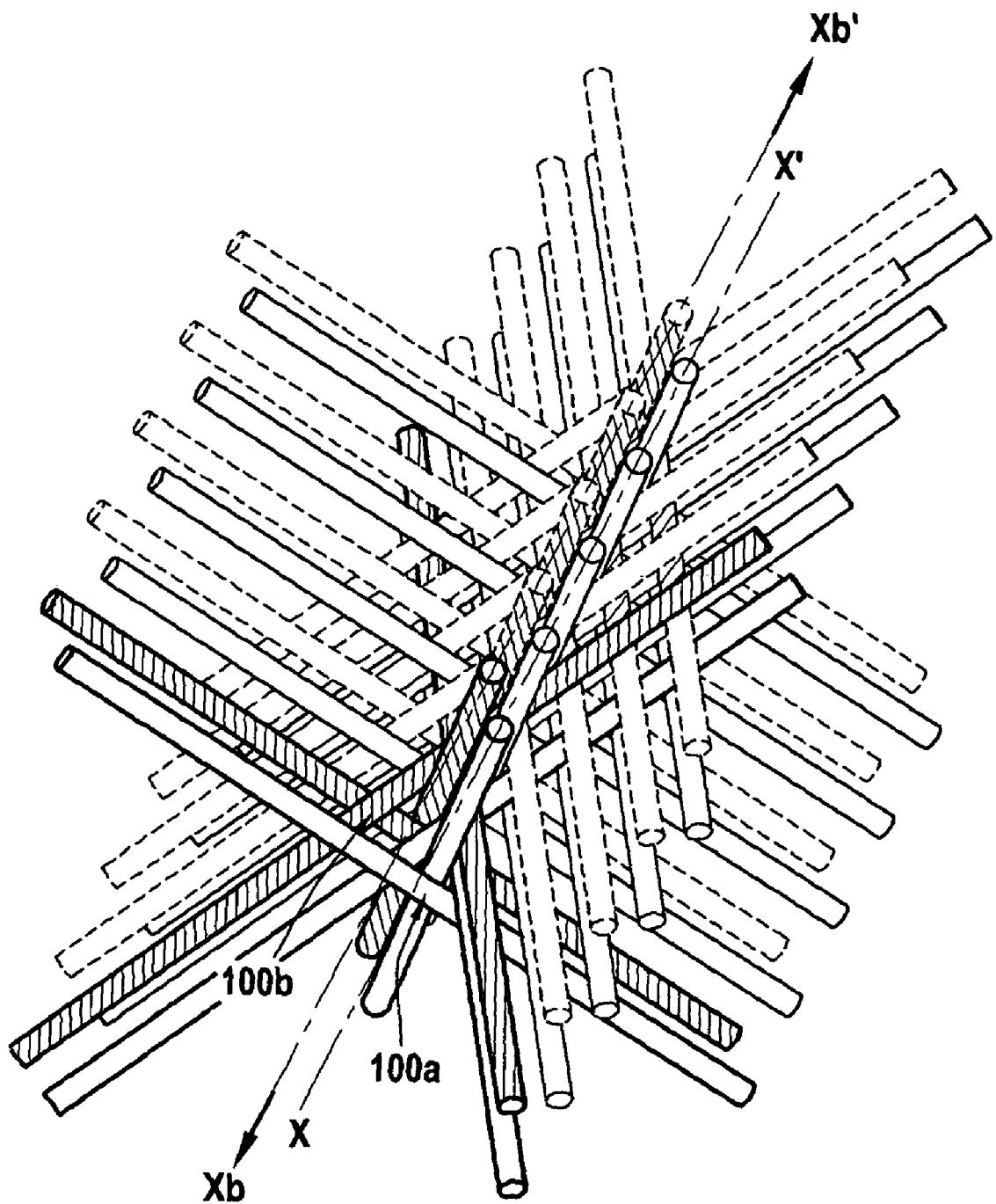
Figure 3A:
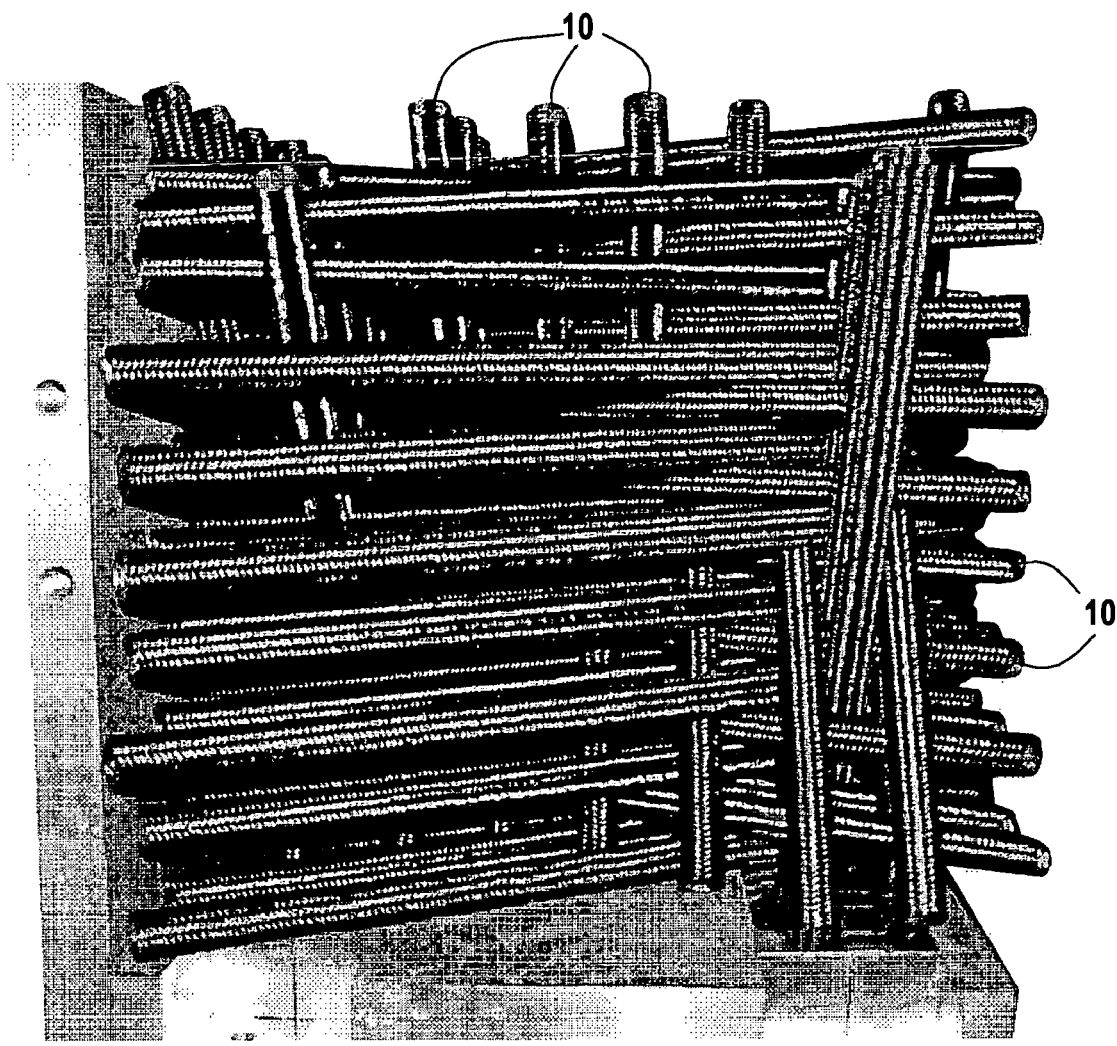
FIGS. 3A to 3B are photographs showing an ordered assembly of tubes made in accordance with the invention.
Figure 3B:
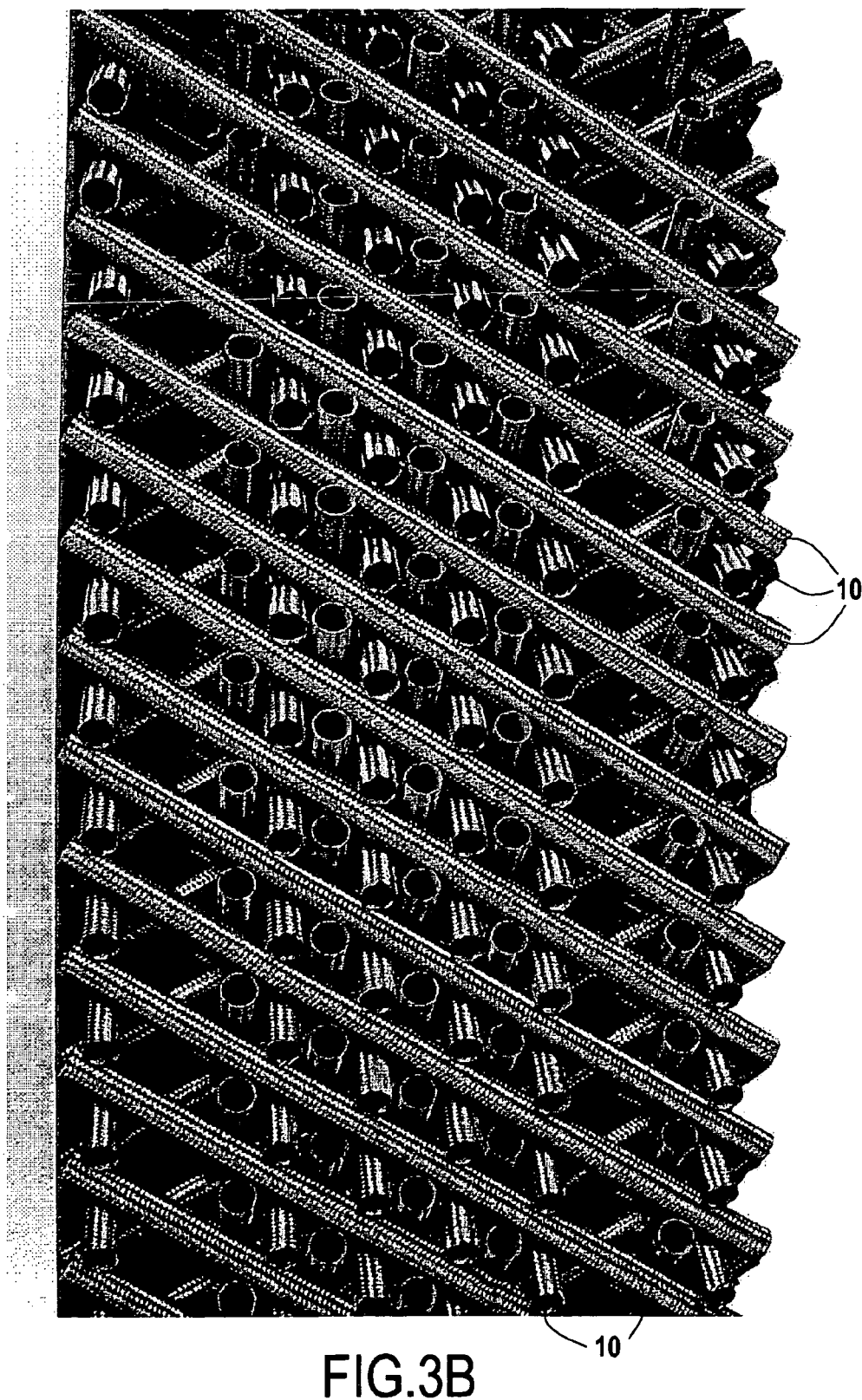

Once a desired number of bundles has been reached in the row 100a, then a plurality of series of rows of bundles are superposed along axes parallel to the axis XX' so as to fill the empty volume around the row 100a. FIG. 2C shows the disposition of an additional row 100b of bundles on a new axis XbX'b parallel to the construction axis XX'. The empty volume on either side of the row 100a is then filled in, typically as far as the ends of the tubes of the row 100a, so as to obtain in said volume a three-dimensional structure formed of tubes extending along four respective directions. FIGS. 3A and 3B show such an assembly being made with tubes 10 supported by tooling.

Figure 2D:
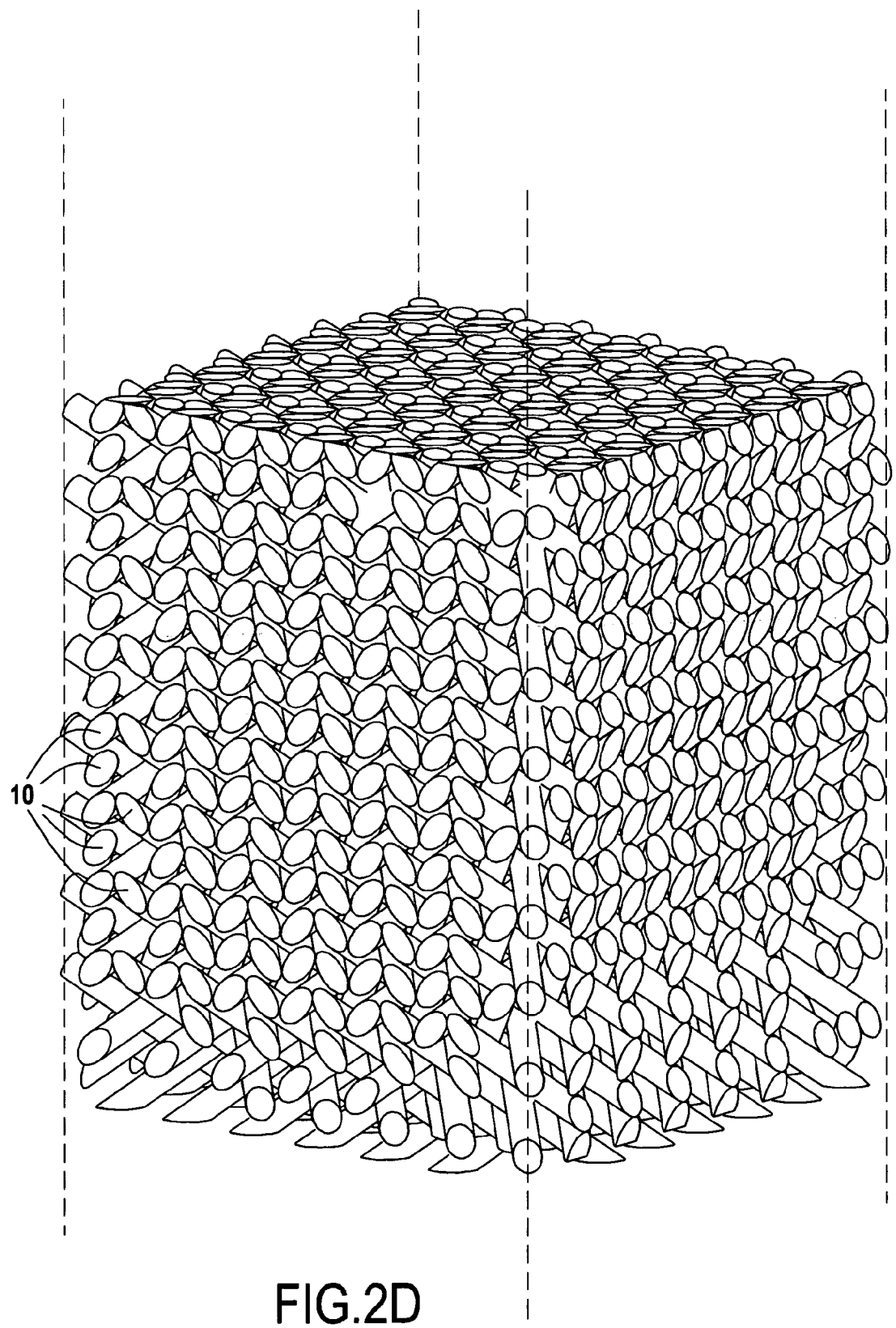

This produces an ordered assembly substantially in the form of a rectangular parallelepiped as shown in FIG. 2D. The resulting ordered assembly has a plurality of tubes 10 opening out into all of the faces of the assembly.

U.S. Pat. No. 4,168,337 describes in detail a method of making an ordered assembly with rectilinear elements disposed along four directions.

Thereafter, the tubes are bonded together (step S3). Bonding is performed only where portions of the tubes come into contact so as to conserve the pores or passages between the tubes for providing additional flow paths for the fluids outside the tubes. The bonding between the tubes can be implemented, for example, using a resin, while taking care to monitor the quantity of resin that is deposited so as to avoid obstructing the pores between the tubes.

Thereafter, the assembly is machined so as to form a packing structure that is matched to the dimensions and to the shape of the fluid exchange column in which it is to be placed (step S4).

Figure 4:
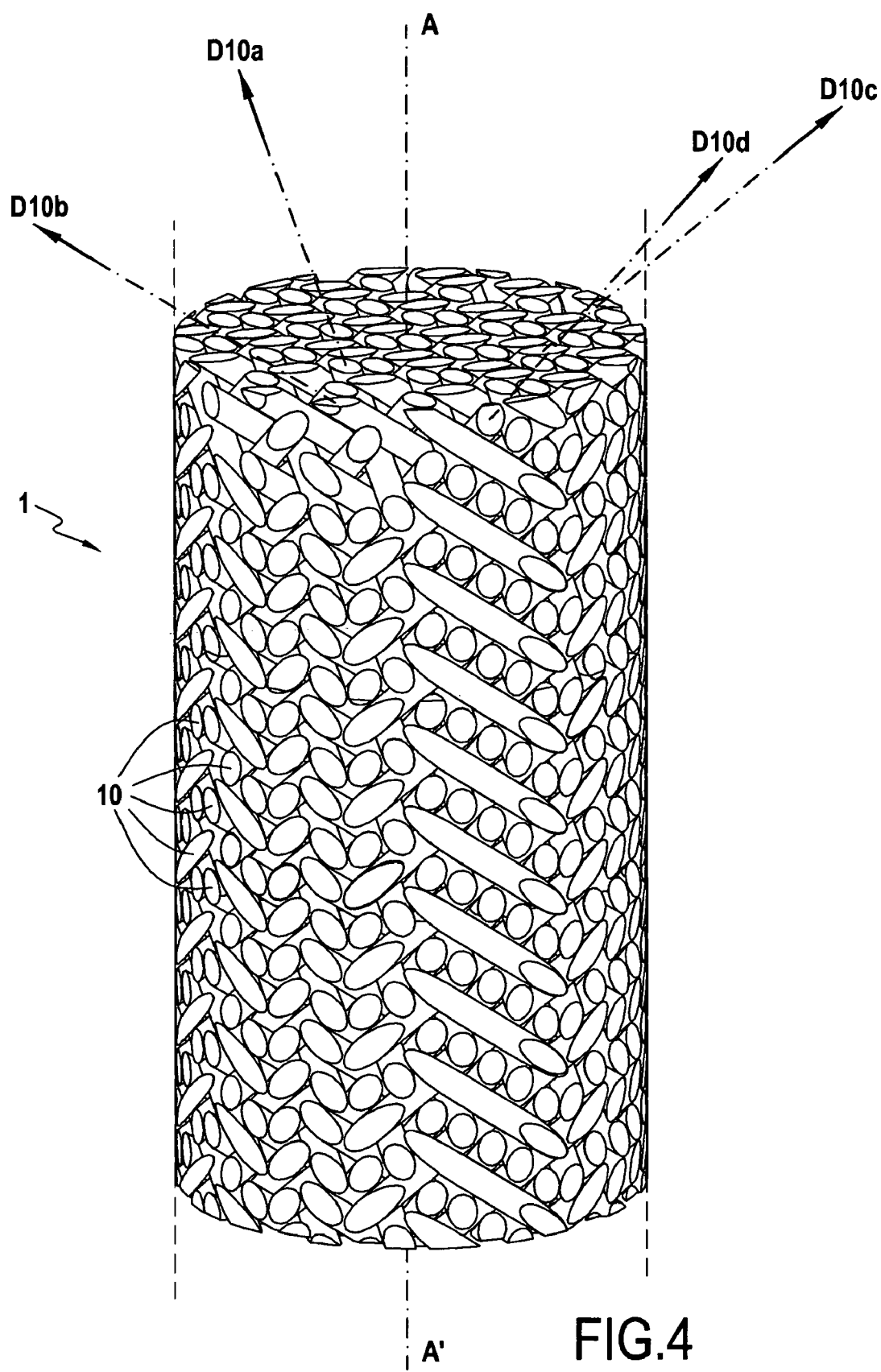
FIG. 4 is a perspective view of an embodiment of a packing structure in accordance with the invention.

Fluid exchange columns, such as distillation columns, generally comprise an enclosure of cylindrical shape. Under such circumstances, the ordered assembly is machined so as to obtain a packing structure that is likewise cylindrical in shape so as to occupy a maximum amount of the space inside the column and thus provide the best possible exchange surface (FIG. 4). The packing structure of the invention could nevertheless have some other shape.

The assembly can be machined to form the packing structure by being cut out using a jet of water under pressure, by using ultrasound, a laser, a milling machine, etc.

Optionally, and when the tubes are made of composite material, e.g. of carbon or of ceramic (SiC), heat treatment may be applied to carbonize the block of tubes and it may optionally be followed by chemical vapor deposition (CVD) of carbon, so as reinforce the bonding between the tubes and improve their ability to withstand corrosion.

In accordance with the method described above and as shown in FIG. 4, a packing structure 1 is obtained that comprises a compact block of tubes 10, all of which are inclined in one of four directions D10a to D10d relative to the axis AA' of the structure which corresponds to the axis of column in which the structure is to be placed, thus making it possible to ensure that each tube is at a determined slope for allowing the liquid phase to pass down through the structure.

Figure 5A:
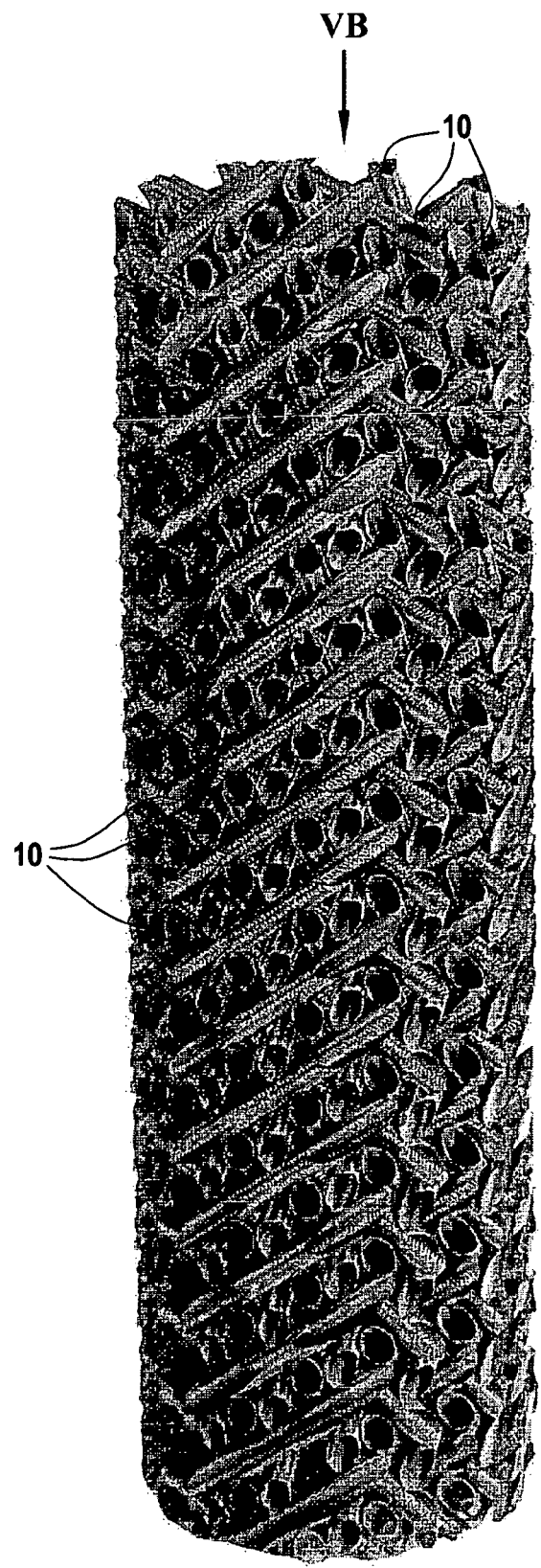
FIGS. 5A and 5B are photographs showing an embodiment of a packing structure of the present invention.
Figure 5B:
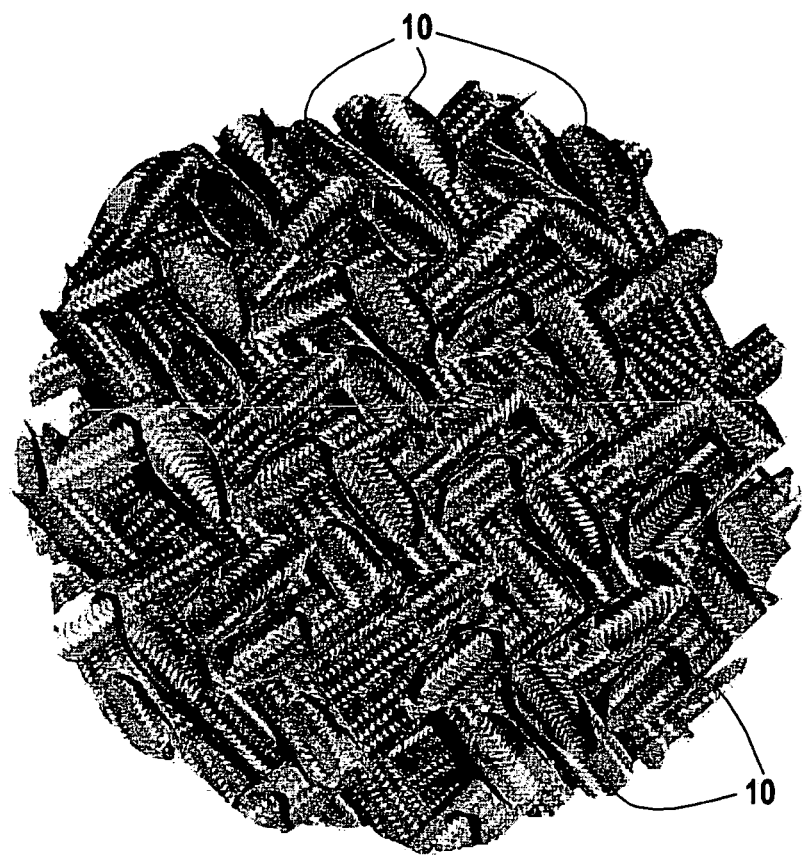

FIGS. 5A and 5B are respectively a side view and a plan view of an embodiment of a packing structure made using tubes 10 themselves made out of consolidated braids. In particular, FIG. 5B shows the multitude of flow paths available for the phases flowing through the packing structure of the present invention.

Figure 6:
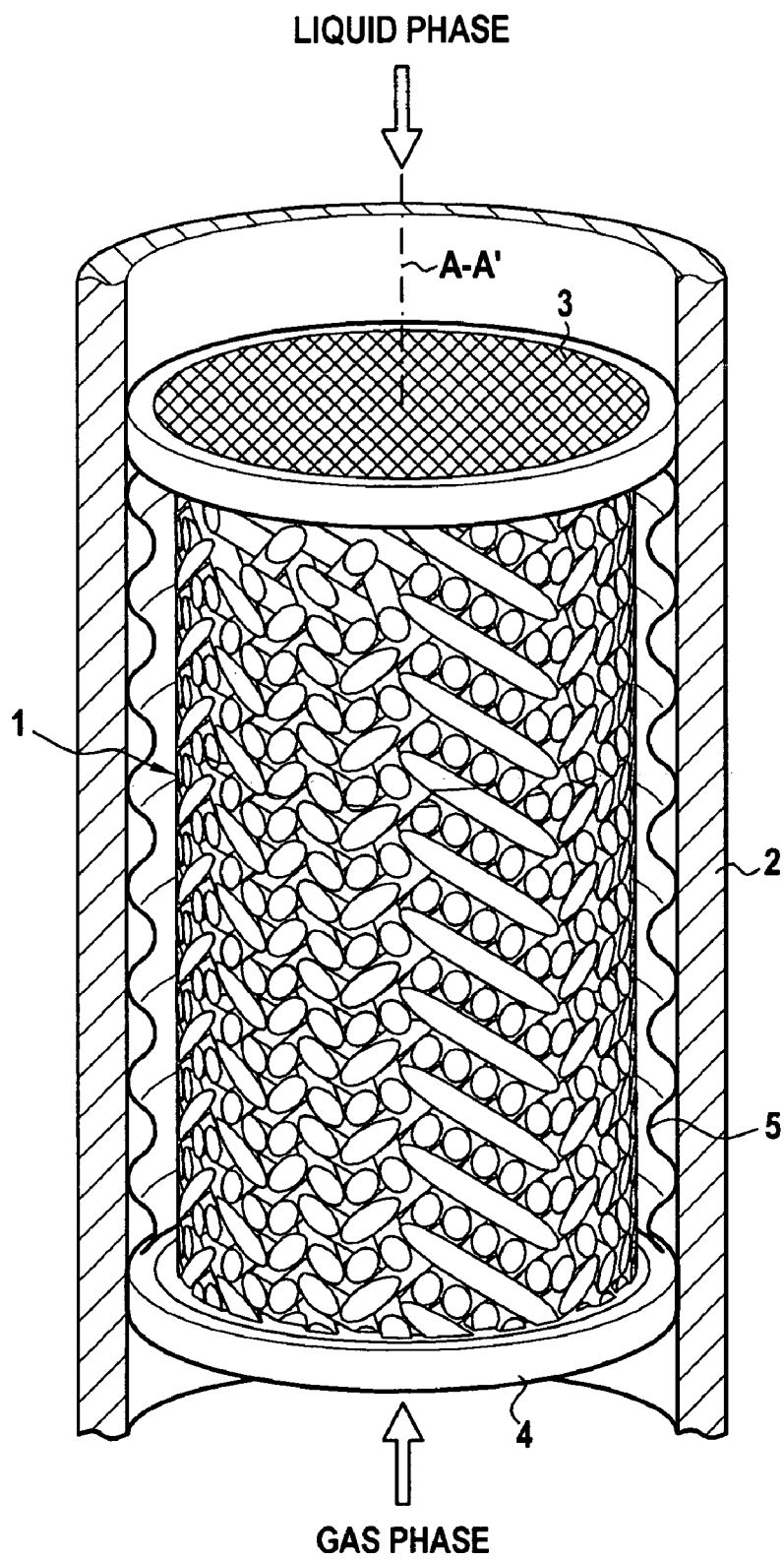
FIG. 6 shows an example of integrating the packing structure of FIG. 3 in a fluid exchange column.

FIG. 6 shows an example of the packing structure 1 integrated in a fluid exchange column for performing mixing between a down-flowing liquid phase and an up-flowing gas phase. The structure 1 can be held inside a cylindrical enclosure 2 of the fluid exchange column by support plates 3 and 4 and by a ferrule 5, which in this example is of corrugated shape, but which could equally well be smooth and may optionally include perforations. The elements for holding the packing structure may be made of the same material as the structure or out of some other material.

Given the shape of the packing structure 1, intimate contact between the down-flowing liquid phase and the up-flowing gas phase can be achieved over a large area (exchange area). The liquid phase flows under gravity through the packing structure following a multitude of passages formed inside and/or outside the tubes 10. On traveling downwards, the liquid phase encounters the gas phase which rises through the structure, likewise following the multitude of passages, thus enabling exchanges to take place between the two phases at numerous locations in the structure, and consequently over a large exchange area.

The packing structure of the invention thus provides a large exchange area for the fluids, and does so without major head losses. The packing structure presents relatively low density of material and an arrangement of tubes that provides a multitude of passages for the fluids. Whatever the location within the structure, the liquid phase and the gas phase can flow easily both along and between the tubes, thus avoiding significant head losses between the bottom and the top of the column.

The exchange area available with the packing structure, i.e. the area of the structure wetted by the liquid phase in the presence of the gas phase corresponds in this example not only to the inside surfaces of the tubes, but also to those portions of their outside surfaces that are not in contact with other tubes, the liquid and gas phases being capable of flowing equally well inside and outside the tubes.

The exchange area of the structure can be further increased by providing macropores through the walls of the tubes suitable for allowing the liquid phase to flow through the macropores and come into contact with the gas phase. By way of example, such macropores can be obtained when the tubes are made from braids, as described above. Under such circumstances, the braiding angle is increased using a support tube of diameter that is greater than the section of the braid so as to form macropores through the braid once it has been consolidated.

Measurements have been taken on a packing structure as shown in FIGS. 5A and 5B (structure made with 10 millimeter (mm) diameter tubes made from consolidated carbon braids). These measurements show that the packing structure of the invention presents performance that is similar to if not better than that of prior art packing structures. The tests have shown that the packing structure of the invention presents an empty fraction of the order of 94% (with the empty fraction that is observed in existing structures lying in the range 92% to 97%), a wetting (i.e. exchange) area of about 600 square meters per cubic meter ($m^2/m^3$) (compared with 150 $m^2/m^3$ to 350 $m^2/m^3$ for existing structures), and a dry head loss of 0.6 millibars (mbar) to 7 mbar with an air flow rate lying in the range 40 cubic meters per hour ($m^3/h$) to 100 $m^3/h$ (compared with 0.3 mbar to 7 mbar for prior art structures).

The geometry of the packing structure of the invention makes it possible to control the physical parameters of fluids in the column (exchange area, flow speed, boundary layer, etc.). The packing structure may also present appropriate contact properties (e.g. wetting angle, surface energy, adsorption, etc.) for matching the natures of the fluids that are to pass through it.

By way of example, the tubes of the structure may present a contact surface made of carbon, either because of the very nature of the material from which the tubes are formed, or else by applying a surface treatment such as a deposit of pyrolytic carbon. Under such circumstances, the contact surface of the tubes, and consequently the exchange surface of the packing structure is a surface that is hydrophobic and that is well wetted by hydrocarbon. Such a surface is consequently used unchanged when organic fluids are involved.

In contrast, when in the presence of an aqueous phase, such a hydrophobic exchange surface is not suitable. Nevertheless, a hydrophobic carbon surface can be made hydrophilic by thermochemical treatment known to the person skilled in the art. These treatments include in particular oxidation treatments that modify the roughness of the surface and above all the surface energy by the technique of grafting functions, also known as functionalizing the surface. Such oxidation should be considered in terms of electron transfer, and can be implemented by:
- controlled oxidation in air, with temperature being raised to above 400° C., or by applying a plasma;
- chemical oxidation using an oxidizing solution such as, for example, bleach, nitric acid, oxygenated water, etc.; or
- electrochemical oxidation using the packing structure as an electrode (anode or cathode) in an electrolysis vessel.

After such oxidation treatment and in the presence of an oxidizing phase containing oxygen, the carbon contact surface possesses grafted polar functions, such as hydroxide, carboxylic, or quinone functions. It is also possible to obtain other types of function, such as amines in the presence of oxidizing phases containing nitrogen functions.

The presence of these functions changes the wettability of the surface, in particular with respect to polar solvents such as water.

This functionalization of the surface also presents an advantage when the exchange area of the packing structure is to serve as well as a support for a catalyst that is required by a subsequent chemical reaction. Adding a catalyst (or a catalyst precursor) is performed by impregnating the structure with a solution that enables the catalyst to be delivered and to be spread over the structure. The solution is then dried by evaporation so as to leave only the catalyst on the surface.

Figure 7:
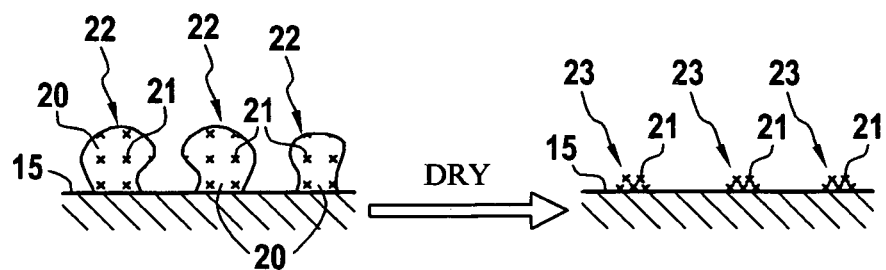
FIG. 7 is a highly diagrammatic view showing a catalyst solution being deposited on a hydrophobic surface.

With a hydrophobic surface 15 as shown in FIG. 7, given the large wetting angle of the surface, a solution 20 containing a catalyst 21 tends to clump together and form large individual droplets 22 that do not coalesce, such that after drying the catalyst 21 is distributed in the form of spots of large clusters 23, leading to a non-uniform distribution of catalyst that is penalizing for the efficiency of the subsequent chemical reaction.

Figure 8:
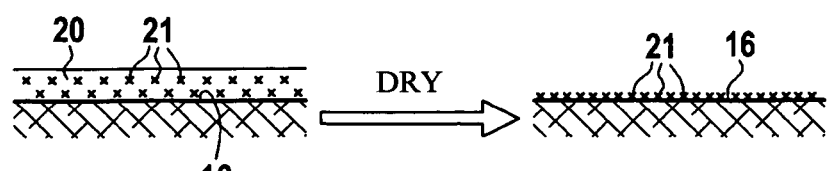
FIG. 8 is a highly diagrammatic view showing a catalyst solution being deposited on a hydrophilic surface.

FIG. 8 applies to a packing that has been functionalized so that its contact 16 surface is hydrophilic and presents a small wetting angle. Under such circumstances, it is observed that the solution 20 containing the catalyst 21 spreads out and dries in the form of a uniform film 24, thus ensuring that the catalyst 21 is well distributed at the surface of the structure, and consequently achieving better control over the subsequent chemical reaction by means of the catalyst.

The invention claimed is:

1. A packing structure for a fluid exchange column, said structure defining an exchange surface for at least one down-flowing liquid phase that is to be put into intimate contact with at least one up-flowing gas phase, the structure being characterized in that it comprises a volume formed by a plurality of rows of bundles of tubes, each bundle comprising four tubes respectively oriented along four directions forming an angle relative to an axis of the structure, the plurality of tubes forming a plurality of passages opening out to an outside surface of the structure, each of the tubes made of carbon-carbon or ceramic composite material and each of the tubes presenting macropores providing passages between insides and the outsides of the tubes.

2. A structure according to claim 1, characterized in that the four tubes of a bundle are oriented along the four diagonals of a cube.

3. A structure according to claim 1, characterized in that the tubes are connected to one another via their contacting portions.

4. A structure according to claim 1, characterized in that the volume includes a plurality of pores between the tubes defining additional passages for the liquid phase and the gas phase through the structure.

5. A structure according to claim 1, characterized in that it is cylindrical in shape, each tube being inclined relative to the axis of the cylindrical structure.

6. A structure according to claim 1, characterized in that the tubes are made of composite material, or of metal, or of thermoplastic material, or of thermosetting material.

7. A method of fabricating a packing structure according to claim 1 for a fluid exchange column, the method being characterized in that it comprises:
   a) forming the tubes;
   b) constructing an ordered assembly of said tubes in a plurality of rows of bundles of tubes, each bundle comprising four tubes respectively oriented along four directions;
   c) bonding the tubes together via their contacting portions; and
   d) machining the ordered assembly to form a packing structure matching the shape and the inside dimensions of the column in which it is to be inserted.

8. A method according to claim 7, characterized in that in step a), the tubes are made of composite material, or of metal, or of thermoplastic material, or of thermosetting material.

9. A method according to claim 8, characterized in that in step a), the tubes are made of carbon or ceramic composite material.

10. A method according to claim 9, characterized in that it further includes a step of carbonizing the tubes by heat treatment followed by a step of chemical vapor deposition (CVD) of carbon.

11. A method according to claim 10, characterized in that in step b), the four tubes of each bundle are oriented along the four diagonals of a cube.

12. A method according to claim 7, characterized in that, in step b), the four tubes of each bundle are oriented along the four diagonals of a cube.

13. A method according to claim 7, characterized in that in step a), the tubes are made of carbon composite material, and in that the method further includes a step of oxidizing said tubes to make their surfaces hydrophilic.

14. A method according to claim 13, characterized in that it further includes a step of impregnating the tubes with a solution containing a chemical catalyst, and a step of drying the solution.

15. A structure according to claim 2, wherein the volume includes a plurality of pores between the tubes, said plurality defining additional passages for the liquid phase and the gas phase through the structure, and wherein each of the four tubes is cylindrical in shape, inclined relative to the axis of the cylindrical structure, connected to one another via their contacting portions, and are made of at least one of:
 a material from the group consisting of a composite material, a metal, a thermoplastic material, and a thermosetting material;
 a carbon composite material that includes a chemical catalyst on their surfaces.

16. A packing structure for a fluid exchange column, said structure defining an exchange surface for at least one down-flowing liquid phase that is to be put into intimate contact with at least one up-flowing gas phase, the structure being characterized in that it comprises a volume formed by a plurality of rows of bundles of tubes, each bundle comprising four tubes respectively oriented along four directions forming an angle relative to an axis of the structure, the plurality of tubes forming a plurality of passages opening out to an outside surface of the structure, each of the tubes made of carbon composite material that includes a chemical catalyst on their surfaces.

* * * * *